United States Patent

[11] 3,582,603

| [72] | Inventor | Milton Hinden<br>15 Bay Link, Massapequa, N.Y. 11758 |
|---|---|---|
| [21] | Appl. No. | 797,603 |
| [22] | Filed | Feb. 7, 1969 |
| [45] | Patented | June 1, 1971 |

[54] METHOD AND APPARATUS FOR ATTACHING INSULATION TO DUCT WORK
6 Claims, 3 Drawing Figs.

[52] U.S. Cl. .................................................. 219/99
[51] Int. Cl. ................................................... B23k 9/20
[50] Field of Search ..................................... 219/98, 99, 101; 24/73

[56] References Cited
UNITED STATES PATENTS

| 2,110,832 | 3/1938 | Hogg et al. | 219/98 |
| 2,378,720 | 6/1945 | Nelson | 219/98 |
| 3,426,394 | 2/1969 | Poupitch | 24/73 |
| 2,379,645 | 7/1945 | Morris | 219/101 |

OTHER REFERENCES

"The Nelson Electric Arc Welder" Publication. Nov. 22, 1946, see page 4. Publication is by Nelson Sales Corp. Lorain Ohio. Copy in group 213, class 219-99. (Copies made in Group 213).

*Primary Examiner*—J. V. Truhe
*Assistant Examiner*—R. O'Neill
*Attorneys*—Mark T. Basseches and Paula T. Basseches ABSTRACT: A resistance welding method for attaching insulating batts to metal duct work using a welding pin having a head of large cross-sectional area and a shank having a turned, lathe sharpened tip. The head portion of the pin is contacted by an enlarged electrode defining a heat sink. The sharpened tip of the pin is advanced through the insulating batt into contact with the duct. Welding current is passed from the electrode through the shank and duct while the tip is continuously pressed against the duct. The sharpened tip is formed to an angle of 45° to 50°. The cross-sectional area of the head is at least 20 times greater than that of the shank.

PATENTED JUN 1 1971 3,582,603
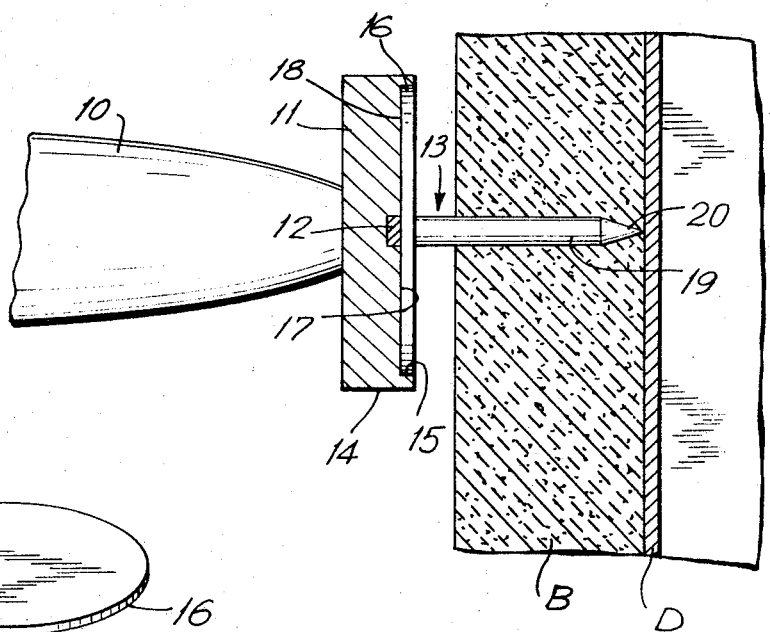
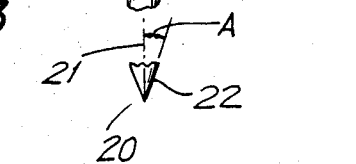
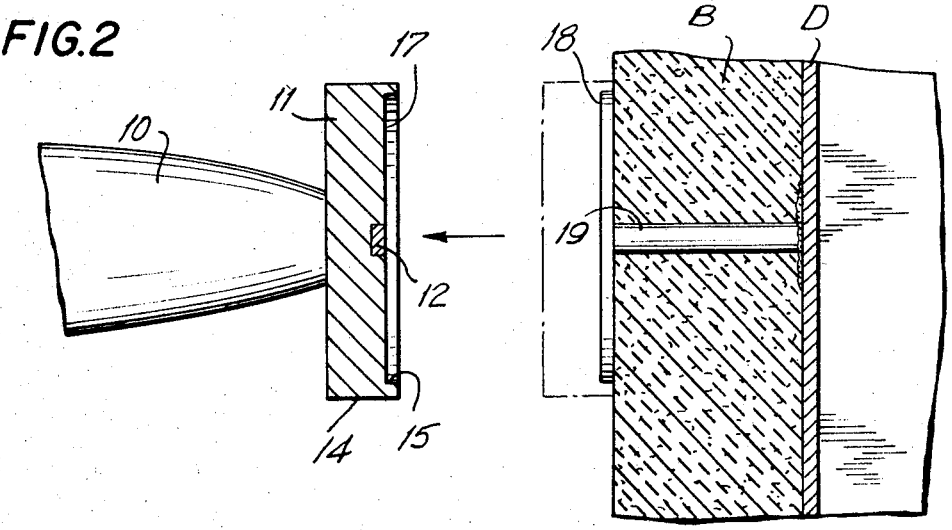
INVENTOR.
MILTON HINDEN
BY Mark Burecher
ATTORNEY 3,582,603

METHOD AND APPARATUS FOR ATTACHING INSULATION TO DUCT WORK

BACKGROUND OF THE INVENTION

1. Field of the Invention

This invention is in the field of attachment mechanisms which are secured to metal elements by welding steps.

2. The Prior Art

It is commonplace to employ welding methods for the attachment of studs and like metallic elements to other metallic components. In the typical welding procedure, an arc is struck between the adjacent parts and, after a melt is produced, the components to be welded are advanced toward each other to secure the same in the desired finished position.

In accordance with a welding method heretofore known, a stud or like element to be attached to a main body of metal is headed and is provided with an extending shank. The stud is inserted into a welding electrode by disposing the shank in an aperture defined in the electrode, the head of the stud being pressed against the metal member defining the other electrode.

In a variation of the last-mentioned method, the back of the head may be provided with a reduced cross section portion, forming a relatively high resistance area, to promote rapid melting at such area.

In the aforementioned welding method, the degree of heat developed other than in the specific weld area is irrelevant since, by reason of the proximity of the stud supporting electrode and the weld area, electricity is not conducted along the stud itself.

In many air-conditioning installations, it is desirable permanently to attach batts, comprising flat masses of insulating material such as fiber glass, against the surface of a metal duct. The use of adhesives for this purpose is commonplace, but such adhesives do not necessarily provide a permanent bond, particularly where condensation may develop on the surface of the duct.

It has been proposed as an additional bond or in lieu of the use of adhesives, to weld projections to the ducts and thereafter apply insulating batts. The batts are pressed over the projecting pins or studs and heads or clips are thereafter applied to the stud portions extending from the insulation. Such method as drawbacks, including uneven or irregular surface appearance, tendency of the clips to loosen and rattle and fall off, difficulty of mounting insulation accurately over the already existing pins, and other related problems beyond the scope of the present discussion.

To avoid these difficulties, it has been attempted first to apply the insulation, preferably with an adhesive bond, thereafter insert studs or pins through the insulation, and effect a subsequent weld, i.e., a weld after the insulation is mounted. Experimental attempts to effect such subsequent weld by the resistance welding methods have proven to be totally impractical since the portion of the electrode adjacent the duct is inaccessible, due to the presence of the insulation, and the welding current must be conducted throughout the length of the shank of the pin. As a result of utilizing the shank as a conductor, heat is generated throughout the length of the shank and communicated to the insulation materials immediately adjacent the shank, causing a melting or decomposition of such materials, resulting in the formation of an enlarged hole in the insulation adjacent the shank. Obviously, where such large hole is formed, the pin or stud is no longer an effective supporting agency.

Attempts to arc weld pins or studs through applied insulation have been made in the past but have not proven successful for a number of reasons. First, it must be recognized that the presence of the insulation layer between the welder and the duct prevents the operator from viewing the tip of the stud in its spaced relation to the duct, thus preventing the drawing of a proper arc.

If there is an adhesive layer between the duct and the insulation, a proper arc cannot be drawn since the dielectric constant of the insulation cannot, of course, be exceeded by low welding voltages.

Thus, while arc-welding procedures might eliminate the damage to the adjacent insulation inherent in resistance welding, there are ancillary difficulties which preclude the use of arc welding in this specific application.

SUMMARY OF THE INVENTION

A resistance welding method for attaching insulating batts to duct work without damage to the insulation adjacent the shank of the attachment pin which includes the steps of providing a hardened attachment pin having a shank, with a head at one end and a tip at the other, the tip being characterized by a sharpened contact point forming an apex, and an essentially frustoconic area merging with the shank.

The point, which is preferably lathe sharpened, has an included angle of about 46° to 48°, the pin being of a Rockwell C hardness of about 48 to 50, to avoid any blunting or flattening tendency when pressed against the duct.

It will thus be observed that the tip defines a progressively increasing cross-sectional area, the entirety of the tip being of lesser diameter than the shank.

The head of the pin is considerably enlarged in respect of the shank, having a cross-sectional area of at least about 25 times the cross-sectional area of the shank.

The entirety or substantially the entirety of the head of the pin is disposed in intimate contact with an electrode so as to define, in addition to the electrical conducting relation between the parts, a high efficiency heat transfer.

The weld is effected by pressing the tip of the pin into engagement with the metal of the duct and thereafter passing a welding current through the head and shank of the pin. By reason of the reduced cross-sectional area of the tip, the melt is started at the tip, the pin being advanced by pressure against the electrode preferably until the full thickness of the shank is connected to the duct. Heat in the main body of the shank is maintained at the minimum, notwithstanding conduction of welding currents throughout the length of the shank, by reason of a combination of factors including the acute angled frustoconic tip and the enlarged head. The reduced cross-sectional area assures an initial high resistance adjacent the tip. The enlarged head assures that heat will continue to be concentrated at the tip after the initial melt, by reason of the fact that the enlarged head rapidly conducts heat away from the shank areas adjacent the head to a heat sink electrode. Since heated metal offers a far higher electrical resistance than the same metal at a lower temperature, it is assured that the major voltage drop will be restricted to the areas of the pin directly adjacent the tip, even though a progressively thicker area is being melted. This factor, combined with the high heat dissipation factor provided by the efficient head conductive relation defined between the enlarged head of the pin and the heat sink defining electrode, ensures that the shank portions of the pin, and particularly the shank portions adjacent the head, will remain relatively cool to a point where the insulation adjacent such shank portions will not be damaged. By rapidly conducting heat through the enlarged head to the welding electrode, the head adjacent areas of the shank are cooled, assuring that the major voltage drop will be at or near the tip since the cool shank portions offer less resistance to electrical flow.

By providing an apparatus in which the electrode adjacent portions are maintained relatively cool and heat is concentrated at the duct adjacent portions, I am, unexpectedly, able to provide a resistance welding method and apparatus whereby elongated, headed pins may be successfully secured to duct work, the pins being previously passed through insulation, without damage to the insulation adjacent the head, the damage, if any, being restricted to the insulation at or near the tip and thus not adversely affecting the holding properties of the pin.

It is, accordingly, an object of the invention to provide an improved resistance welding method for securing elongated pins to metal ducts after insulation has already been applied to the ducts.

It is a further object of the invention to provide a method of resistance welding for securing insulation to ducts wherein the welding current is transmitted the length of the welding pin and wherein the welding heat is continuously concentrated adjacent the duct.

It is a further object of the invention to provide apparatus for carrying out the method as described.

To attain these objects and such further objects as may appear herein or be hereinafter pointed out, reference is made to the accompanying drawings, forming a part hereof, in which:

FIG. 1 is a diagrammatic view of an apparatus for forming a resistance weld in the manner set forth;

FIG. 2 is a view of the components of FIG. 1 after formation of the weld;

FIG. 3 is a magnified, fragmentary view of a welding pin in accordance with the invention.

Referring now to the drawings, in FIG. 1, 10 is an electrode forming one conductor of the welding circuit. The conductor, which is preferably formed of a massive copper construction, includes a welding tip 11 which may, for convenience, include a permanent magnet 12 to facilitate supporting the ferrous welding pin 13 in the welding chuck 14, in a manner well known.

The chuck preferably includes a recess 15 of a size to receive the enlarged head portion 16 of the pin 13. While in the illustrated embodiment the pin head is disclosed as integral with the shank, it will be appreciated that the functions of the head may be carried out by a two-piece construction wherein an enlarged washerlike element, preferably of a high coefficient of heat conduction, is intimately pressed against the shank and against the head integral with the shank.

It is highly desirable that the mating areas defined by the downwardly directed surface portions 17 of the recess 15 of the chuck and the uppermost surfaces 18 of the head are in intimate engagement throughout substantially the entirety of their juxtaposed faces. As more particularly pointed out hereafter, the intimate engagement is required not so much for optimum electric conduction characteristics but, rather, because the chuck or welding tip 11 and the electrode 10 provide heat sink, temperature dissipating mechanism.

It is further important that the cross-sectional area of the head 16 be considerably larger than the cross-sectional area of the shank 19 of the pin 13.

In practice, it has been determined that the ratios of the area of the head to the area of the shank should be at least about 20 or 25 to one, so as to provide the necessary heat exchange relationship.

The shank 19 of the pin is provided with a tip 20 at the end remote from the head. The construction of the tip is an important feature since the tip functions in a special and unusual manner in the welding procedure. I have determined that it is imperative that an extremely sharp tip be employed. The angle A (see FIG. 3) defined between the axis 21 of the shank and the periphery 22 of the frustoconic tip 20 is preferably, but not necessarily, maintained in a range of from about 23° to about 24°, making a total included angle of about 46° to 48°.

For purposes of illustration and by way of example, resistance welding of the type herein described has been effectively carried out by the use of a pin having the following characteristics:

| | Inches |
|---|---|
| Head diameter | 1 |
| Shank thickness | .149 |
| Shank length | .4–1.9 |

The above-noted dimensions are directed to a steel pin having a melt temperature of approximately 2,800° F. and having a coefficient of electrical resistance of about 0.005 ohms per degree C.

The weld is effected by placing the head 16 of the pin into the recess 15 of the welding electrode, the magnet 12 serving to retain the pin in the noted position. The pin is advanced through the insulator batt B, which will normally comprise glass fibers which may or may not include minor quantities of resinous materials to act as a binder.

The pin is advanced through the body of the insulation by a downward pressure on the electrode 10, bringing the tip into contact with the duct D. In the use of a pin having the dimensions above noted, a downward pressure of about 80 pounds is exerted against the head of the pin. By reason of the sharpened tip, it is possible to advance the pin through the batt without having the tip carry with it fibrous elements of the insulator batt B. If a welding pin of significantly softer composition is employed, the entire shank will heat simultaneously, ruining the insulation due to the formation of a large contact area resulting from the blunting of the tip. Application of unduly high pressures will have a similar effect.

It will be appreciated that in view of the low voltages involved, if any fiber is disposed adjacent the tip and is interposed between the tip and the duct D, no welding current will be permitted to flow and it will be necessary to remove and reinsert the pin.

Also, it is desirable that the peripheral walls 22 of the frustoconic tip be extremely smooth so that fibers are not carried toward the duct with these portions of the pin since, in the event of such occurrence, the fibers will be incorporated in the weld and will compromise the strength thereof.

In order to secure the desired point sharpness and smoothness of sides, I have found it necessary to lathe turn the pins since nail pointing devices known to me have been completely ineffective consistently to provide pins displaying the requisite welding characteristics.

It has further been determined that unless a hardened pin is used, the tip will tend to blunt or round upon contact with the duct. If such blunting occurs, the resistance at the area adjacent the duct is reduced, due to the greater contacting area, and an undue amount of heat is generated in the pin shank, resulting in damage to the insulation.

After the pin has been properly disposed against the duct D, a welding current ultimately reaching a maximum of about 60 amperes is applied for a period of 5 seconds, while maintaining the above-noted downward pressure. As the current begins to flow, the duct-adjacent portions of the tip melt, permitting progressive downward movement and a progressive melting of the tip area. When the melt has reached the thickness of the major shank portion, the current flow is interrupted and the weld is complete.

The weld current at the initial stages of the formation of the weld is comparatively small, the current flow reaching about 60 amperes when the full thickness of the pin is disposed in the melt pool.

As will be appreciated from the foregoing, the current flow will progressively increase from the minimum to the maximum values as progressively thicker cross sections of the tip are disposed in the melt pool.

I have determined that by the use of the large area head and heat sink connection with the electrode in combination with the reduced area, progressively increasing thickness pin tip, a large temperature differential may be maintained between the portions of the shank adjacent the head and the portions adjacent the duct. The importance of providing such temperature differential is to concentrate the electrical resistance of the pin adjacent the metal area. With the noted arrangement, temperature differentials of about 2,500° F. are experienced in a 1-inch length pin. Thus, an increment of the shank adjacent the weld area will have an electrical resistance over a thousand times the value of a comparable increment of the shank adjacent the head. Accordingly, the voltage drop and prime heating effects may be restricted to the desired area adjacent the melt even after the point of the pin has been consumed and the full thickness of shank is disposed in the weld.

A most important feature of the invention lies in the use of the enlarged head area which, through its heat transmitting connection to the welding electrode, maintains the shank in a desired cooled condition. Attempts to effect resistance welds using pins not having enlarged head portions have proven uniformly unsuccessful, since they have exhibited the faults of damage to the insulation, bending of the shank area and the like.

Specifically, and without limitation to any theory, the success of the welding methods described are attributed to the interplay of a combination of factors including:

1. use of a sharpened tip to provide or control high resistance adjacent the duct;
2. the use of an enlarged head portion rapidly to dissipate heat adjacent the head of the pin and thus maintain a high-temperature differential over the length of the shank, thus to maintain the electrical resistance of shank increments remote from the head at a far higher value than increments near the head.
3. the use of an electrode having a large heat sink effect contacting the enlarged head area of the pin to obtain maximum heat transfer away from the head of the pin.

From the foregoing it will be appreciated that there is provided, in accordance with the invention, a resistance welding method and pin for use therewith wherein current is transmitted through the length of the pin and wherein electrical resistance and, hence, heat generation, is restricted to the weld area. Initially the resistance is concentrated at the tip by the geometry of the pin. Subsequent to the start of welding, the use of heat dissipation techniques at the head maintains the electrical resistance of the head adjacent areas at a far lower value than the tip areas, thus confining the major voltage drop and, therefore, heat generation, to the shank portions nearest the weld. There is thus provided, from the first time, an electrical resistance welding technique wherein current is transmitted through the length of a shank and yet the temperatures developed in the shank remote from the weld are maintained at a tolerably low level, thus to prevent damage to insulation materials adjacent the shank.

Accordingly, by the use of the welding method and pin device of the invention, resistance welding techniques have for the first time become practicable for attachment of insulation to ducts and like applications. The process should not be taken to be restricted to the attachment of insulation of ducting but, rather, may be applied to other situations in which a metal pin is passed through material and thereafter resistance welded to a substrate and wherein it is important to avoid overheating the head adjacent parts of the pin, to prevent damage to the material.

Having thus described the invention and illustrated its use, what I claim as new and is desired to be secured by Letters Patent is:

1. The method of attaching an insulator batt or the like to a metal substrate, comprising the steps of providing a welding pin having an elongated shank with a turned, sharpened tip tapering to a point at one end and an enlarged head having an area of at least about 20 times the shank cross section at the other end, advancing said pin, point first, through said batt and into pressured contact with said substrate, passing a welding current through the length of said pin to melt said tip while maintaining said head in intimate contact with an electrode defining a heat sink, and while continuously pressing said tip against said substrate, thereby to melt said tip to effect a weld to said substrate while simultaneously cooling said head and the head adjacent portions of said shank to maintain a temperature differential of at least about 1,500° F. between said tip of said pin and the portions of said shank adjacent said head, whereby the electrical resistance of increments of said shank adjacent said tip, after commencement of said weld, greatly exceed the electrical resistance of portions of said shank adjacent said head.

2. The method of attaching an insulative batt or the like to a metal substrate, such as a duct, by resistance welding through the use of an elongated pin having a head portion, the cross-sectional area of which is at least about 20 times the cross-sectional area of the shank of said pin, said pin having a tapered, turned, sharpened tip, which comprises the steps of intimately contacting said head portion with an electrode which also comprises a heat sink, pressing said pointed tip against said substrate and passing a current from said electrode through the length of said pin into said duct while continuing said pressure of said tip against said substrate to melt said tip portion while said head of said pin is maintained in intimate contact with said heat sink electrode, thereby to establish a high-temperature gradient along the length of said pin and divide said pin into high resistance areas adjacent said duct and low resistance areas adjacent said head.

3. The method of claim 2 wherein the electrical resistance of said high resistance areas is about 1,000 times the electrical resistance of said low resistance areas.

4. The method of attaching an insulative batt comprising a material subject to disintegration under intense heat to a metallic duct by resistance welding, comprising the steps of providing a conductive welding pin including an elongated shank having a sharpened, turned tip at one end and an enlarged head at the other, contacting said head with a first electrode defining a heat sink, contacting said duct with the other electrode, advancing said pin, tip end first, through said insulating batt to bring said tip into conductive contact with said duct, and passing a welding current through said head and shank while continuously pressing said tip against said duct, thereby to effect a resistance weld between said tip portion of said pin and said duct while simultaneously cooling said head and the head adjacent portions of said shank of said pin by the contact of said head and said first electrode, thereby to prevent overheating of said pin in the areas of said shank adjacent said head to avoid heat damage to the portion of said batt juxtaposed to said head adjacent portions.

5. The method of claim 4 wherein the cross-sectional area of said head is about 20 times the cross-sectional area of said shank.

6. The method of claim 5 wherein said tip is essentially conical in vertical section, the side portions of said tip being substantially smooth, the total included angle of said tip being about 45° to about 50°.